Jan. 2, 1951 E. S. TAMM 2,536,784
MOTOR BEARING AND METHOD OF ASSEMBLY
Filed Sept. 2, 1949

INVENTOR.
Emil S. Tamm
BY Harry S. Dumars
ATTORNEY.

Patented Jan. 2, 1951

2,536,784

UNITED STATES PATENT OFFICE 2,536,784

MOTOR BEARING AND METHOD OF ASSEMBLY

Emil S. Tamm, Plainfield, N. J., assignor to The Hoover Company, North Canton, Ohio, a corporation of Ohio Application September 2, 1949, Serial No. 113,808

4 Claims. (Cl. 308—189)

This invention relates to motors and more particularly to an anti-friction bearing therefor and to the method of assembling it to the end bell of a fractional horsepower motor.

In certain applications of fractional horsepower motors it is an absolute necessity that all end play be removed from the armature shaft. One way of eliminating end play where anti-friction bearings are used is to lock the bearings both to the end bell of the motor and to the motor shaft. Thus, the inner race of the bearing may be press fitted to the armature shaft and the outer race locked in a bore of the end bell by means of a clamp ring. This ordinarily would not present any difficulty. However, in some applications there are obstructions which prevent access to the clamping ring and the alignment of the bolt holes in the end bell with those in the clamp ring becomes a difficult problem.

According to the present invention the foregoing difficulties are remedied by providing a flinger cup immediately inwardly of the bearing having a flange of greater outside diameter than the inside diameter of the clamping ring whereby frictional engagement of the inner edge of the clamping ring with the outer edge of the flange of the flinger cup will prevent rotation of the clamp ring while the bolt holes of the end bell are being aligned with those in the clamp ring.

Specifically, according to this invention, a dished and flanged flinger cup is press fitted against a shoulder on the armature shaft with its dished side lying against the shoulder, the clamp ring is assembled over the protruding dished portion of the flinger cup with its inner edge lying against the outer edge of the flange of the flinger cup, the inner race of the bearing is press fitted to the shaft so as to abut the flinger cup, a locking sleeve is press fitted to the shaft against the inner race of the bearing, the bore of the end bell is slid over the outer race of the bearing, the assembly is upended so that the inner edge of the clamp ring frictionally engages the flange of the flinger cup, screws are inserted in the holes in the end bell radially of its bore and radially aligned with cooperating threaded apertures in the clamp ring, the bell is rotated until the screws enter the coacting threaded holes in the clamp ring and the screws are tightened to draw the clamp ring against the outer race of the bearing and out of contact with the flinger cup both axially and radially.

The coating faces of the flinger cup flange and the clamp ring are preferably serrated to assure that the clamp ring will not rotate with the end bell and the holes in the clamp ring may be provided with indentations during the stamping process so that the screws will more readily enter the openings in the clamp ring when the holes in the end bell come into circumferential alignment with the threaded apertures in the clamp ring.

According to another feature of this invention the inner edge of the clamp ring and the outer edge of the flange of the flinger cup form a labyrinth seal for the bearing whereby any material present in the interior of the motor will be prevented from entering the bearing.

Other objects and advantages of this invention will become apparent as the description proceeds when taken in connection with the accompanying drawings in which.

Figure 1:
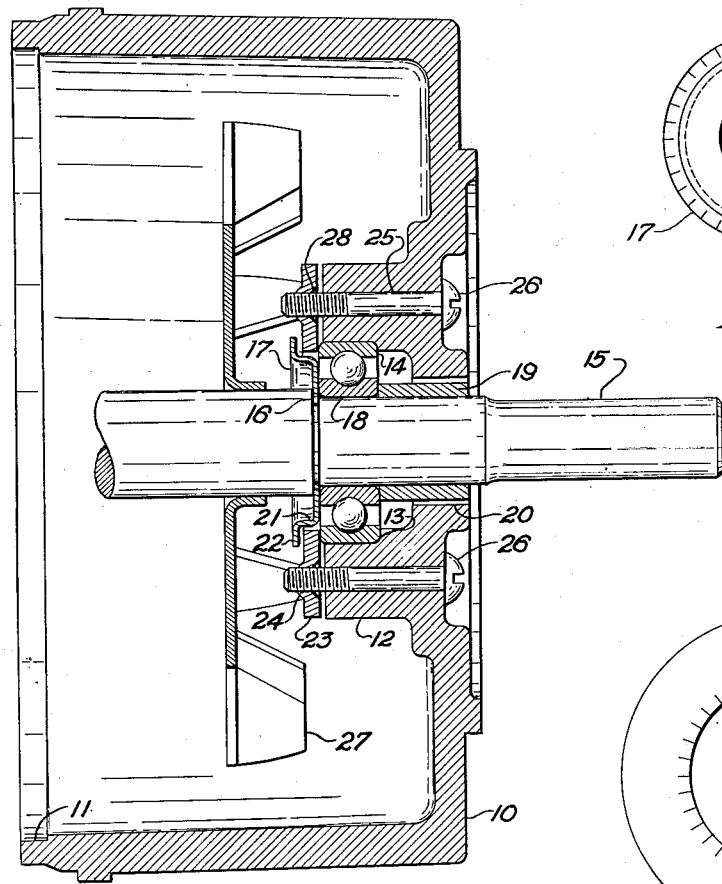
Figure 1 is a cross-sectional view of an end bell of a fractional horsepower motor showing an anti-friction bearing and rotor shaft assembled therewith according to this invention.

Referring to the drawings the reference numeral 10 represents one end bell of a friction horsepower motor. The open end of the end bell 10 has an internal shoulder 11 for interfitting with the main casing of the motor in a manner well known in the art. The end bell 10 is also provided with a boss 12 having a shouldered bore 13 to loosely receive the outer race 14 of an anti-friction bearing. The bore 13 is of slightly less depth than the thickness of the outer race 14 for a purpose which will presently appear.

The armature shaft 15 is provided with a shoulder 16 against which is positioned a flinger cup generally indicated by the reference numeral 17. The inner race 18 of the bearing is press fitted to the reduced portion of the shaft 15 so as to press the flinger cup 17 tightly against the shoulder 16. A locking sleeve 19 is also press fitted to the reduced portion of the shaft 15 so as to fit tightly against the inner race 18 of the bearing and is received in a bore 20 in the closed end of the end bell 10.

As shown, the flinger cup 17 is dished at 21 and has a flange 22 extending radially from the cupped portion 21. The outer periphery of the flange 22 has a greater outside diameter than the inside diameter of the clamping ring 23 which clamps the outer race 14 into the bore 13 of the end bell. The clamp ring 23 has a plurality of threaded apertures 24 for alignment with screw receiving holes 25 extending through the boss 12 radially outward of the bore 13 and extending through the outer face of the closed end of the bell 10. Screws 26 extend through the openings 25 and are threaded into openings 24 in the clamp ring 23 to tightly clamp the outer race 14 into the bore 13.

A ventilating fan 27 is press fitted to the shaft 15 inwardly of the flinger cup 17.

Figure 4:
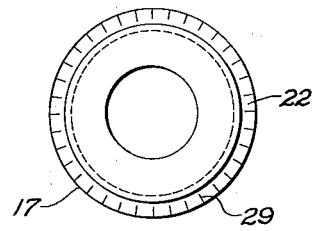
Figure 4 is a plan view of the flinger cup of this invention.
Figure 3:
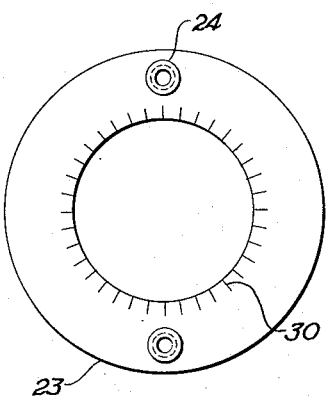
Figure 3 is a plan view of the clamp ring of this invention.

As shown, the openings 24 in the clamp ring 23 are provided with indentations 28. As shown in Figs. 3 and 4 the flange 22 of the flinger cup is serrated at 29 on its bottom face near its periphery and the clamp ring 23 is serrated at 30 near its inner edge of the face opposite the indentations 28.

Assembly

The fan 27 is fitted to the shaft 15 at the proper distance inwardly of the shoulder 16. The flinger cup 17 is then press fitted to the reduced portion of the shaft 15 so that the shoulder 16 abuts against its bottom interiorly of the dished portion 21. The clamp ring 23 is then assembled over the dished portion 21 of the flinger cup 17 so as to lie against its flange 22. It will be noted that the inside diameter of clamp ring 23 is only slightly greater than the outside diameter of the dished portion 21 of the flinger cup 17 so that the openings 24 in the clamp 23 will be closely aligned radially with the openings 25 in the end bell 10 even before the screws 26 are in place.

Figure 2:
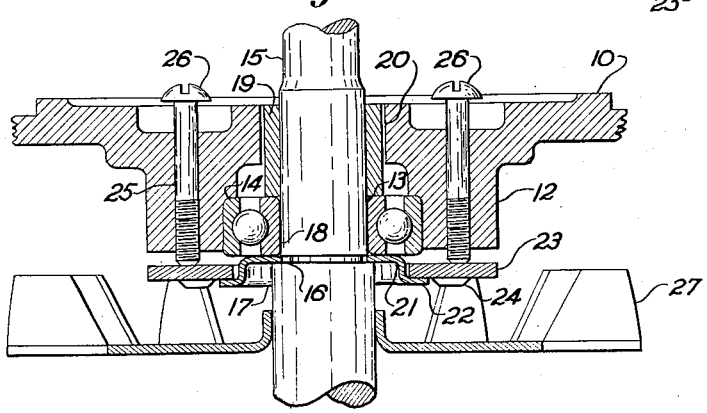
Figure 2 is a view similar to Fig. 1 showing the end bell turned on its end and with the parts positioned preparatory to alignment of the screw holes in the end bell and clamp ring respectively.

The inner race 18 and the locking sleeve 19 are then press fitted to the reduced portion of the shaft 15 tightly against the bottom of the flinger cup 17. The bore 13 of the end bell 10 is then slid over the outer race 14. If the assembly is not already in vertical position it is upended as shown in Fig. 2 and the parts will take the position shown with the clamp ring resting on the flange 22 of the flinger cup 17 and with their respective serrated faces in engagement. Usually, as shown in Fig. 2, the threaded openings 24 are out of circumferential alignment with the openings 25 in the end bell 10. If such be the case, the screws 26 are inserted into the openings 25 so that their threaded ends rest on the surface of the clamping plate 23.

The end bell 10 is then rotated. The friction between the flange 22 and the clamp ring 23 will prevent rotation of the clamping ring 23 and the indentations 28 will eventually be aligned circumferentially with the threaded ends of the bolts 26 and the threaded ends of the bolts will then drop into the indentations 28.

The screws 26 may then be tightened to bring the clamp ring 23 tightly against the projecting edge of the outer race 14 to rigidly clamp it in the bore 13. This will also move the clamping ring 23 axially away from the flange 22 of the flinger cup and also space its inner periphery radially of the outer periphery of the dished portion 21 of the cup 17 whereby the cup may rotate freely without contact with the clamp ring 23.

It has been found in practice that the indentations 28 and the serrations 29 and 30 are not essential but that the assembly method of this invention can be performed without them. However, since they can be formed during the operation of stamping the blank it is preferred that they be provided in order to render the assembly operation more precise.

It is to be noted that since the flange 22 is inwardly of the clamp ring 23, is of greater outside diameter than the inside diameter of the clamp ring 23, and the clearance between the inside diameter of the clamp ring 23 and the outside diameter of the dished portion 21 is small, a labyrinth seal is formed between the interior of the bell 10 and the anti-friction bearing to prevent any material which may be found within the end bell 10 from entering the bearing and interfering with its operation.

While I have shown and described but a single embodiment of my invention it is to be understood that this embodiment is to be taken as illustrative only and not in a limiting sense. I do not wish to be limited to the particular structure and method shown and described but to include all equivalent variations thereof except as limited by the scope of the claims.

It is to be understood that the protection herein applied for is not confined to the particular combinations of features or elements set out in the following claims. Protection is herein applied for for any one or more of the features or elements referred to in the following claims, or described in the foregoing specification or shown in the accompanying drawings, either independently or in combination.

I claim:

1. The method of assembling an anti-friction bearing to an end bell and armature shaft of a fractional horsepower motor so as to eliminate end play of the shaft comprising, the steps of press fitting a dished and flanged ring against a shoulder on the armature shaft with the flange facing inwardly, assembling a clamping ring having an inside diameter less than the outside diameter of the flange of said dished ring and slightly greater than the outside diameter of the dished portion of said ring over the dished portion of said ring so as to lie against the flange of said ring, press fitting the inner race of the bearing to the shaft against the dished and flanged ring, sliding the bored end bell over the outer race of the bearing, upending the assembly so that the clamp ring frictionally engages the flange of the dished and flanged ring, placing screws in apertures in radial alignment with threaded openings in the clamp ring so that their threaded ends rest on the clamp ring, rotating the end bell to circumferentially align the screw receiving holes therein with the threaded openings in the clamp ring while the clamp ring is held against rotation by the frictional engagement with the flange of the dished ring, and tightening the screws to draw the clamp ring against the outer race of the bearing to clamp it in the bore of the end bell and to remove the clamp ring axially free of contact with the flange of the dished ring and radially free of the dished portion of the dished ring.

2. A bearing assembly for a fractional horsepower motor comprising, a shouldered armature shaft, a dished and flanged flinger cup press fitted against the shoulder of said shaft with the shoulder positioned within the dish of the cup, an anti-friction bearing having its inner race press fitted to said shaft and abutting the bottom of said cup, an end bell having a bore loosely fitting over the outer race of said bearing, a combined clamping ring and labyrinth seal member lying between the flange of said cup and the outer race of said bearing and surrounding the dished portion of said cup, said clamp ring having threaded openings in radial alignment with screw receiving openings extending through the end bell, the inside diameter of said ring being less than the outside diameter of said flange and less than the outside diameter of the outer race of said bearing and slightly greater than the outside diameter of the dished portion of said cup whereby frictional contact between said clamp ring and said flange may be utilized to prevent rotation of said clamp ring during circumferential alignment of said threaded openings with said screw receiving openings, and screws extending through said screw receiving openings and threaded into the screw threaded openings in said clamp ring to draw said clamp ring against the outer race of said bearing and hold it tightly in the bore of the end bell and out of axial contact with the flange of said cup and out of radial contact with the dished portion of said cup.

3. A bearing assembly according to claim 2 in which said threaded openings have indentations facing said screw receiving openings in the end bell.

4. A bearing assembly according to claim 3 in which the facing edges of said flange and clamp ring have cooperating serrations thereon.

EMIL S. TAMM.

No references cited.